UNITED STATES PATENT OFFICE.

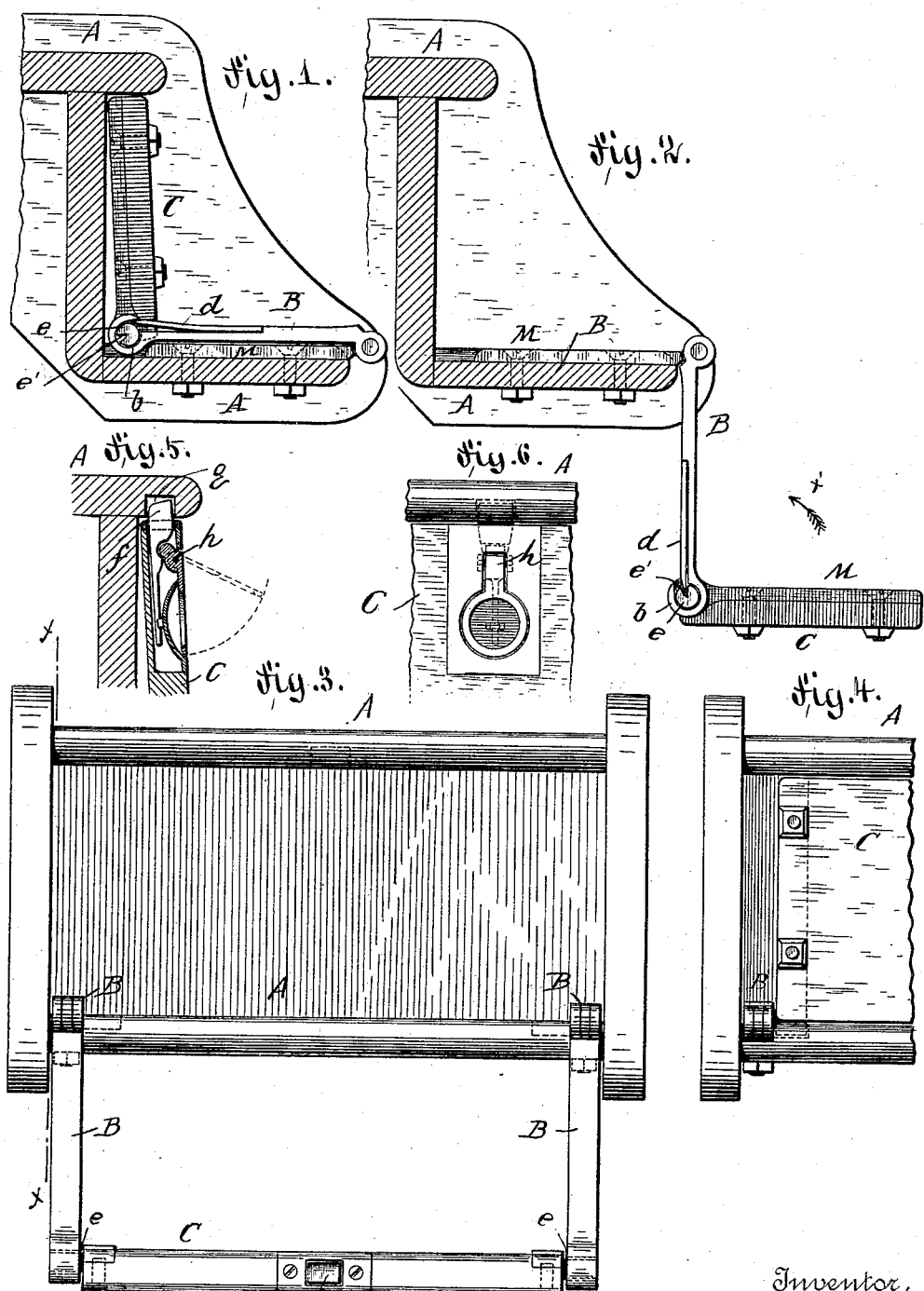

JOSEPH SOLATINOW, OF PATERSON, NEW JERSEY.

EXTENSION-STEP FOR RAILWAY-CARS.

SPECIFICATION forming part of Letters Patent No. 387,374, dated August 7, 1888.

Application filed May 26, 1888. Serial No. 275,215. (No model.)

*To all whom it may concern:*

Be it known that I, JOSEPH SOLATINOW, of Paterson, in the county of Passaic, State of New Jersey, have invented certain new and useful Improvements in Extension-Steps for Railway-Car Steps, of which the following is a specification.

This invention relates to an improved extension-step to be used with steps of railway-cars and other vehicles, so as to dispense with the portable steps heretofore in use and to facilitate the entrance of passengers into vehicles or cars; and the invention consists of an extension-step that is pivoted to supporting-straps which are hinged to fixed straps of the lowermost step of a vehicle or railway-car, the extension-step being locked to the straps when in horizontal position by means of locking-springs that engage recesses in the pivots of the extension-step, the step being folded up against the rise of the next step and locked thereto when not required for use by swinging the step first on its axis in between the straps, thereby releasing the locking-spring, and then with the hinged supporting-straps against the riser of the next step, as will be fully described and set forth hereinafter, and finally be pointed out in the claims.

In the accompanying drawings, Figures 1 and 2 represent vertical transverse sections of my improved extension-step on the line x x, Fig. 3, showing the same respectively in position as folded against the riser of the fixed step and in a position below the fixed step. Fig. 3 is a front elevation of Fig. 2; Fig. 4, a front elevation of a part of Fig. 1; and Figs. 5 and 6 show, respectively, a vertical transverse section and a front view of the locking device of my improved step, drawn on a larger scale.

Similar letters of reference indicate corresponding parts.

A in the drawings represents the fixed steps of a carriage, omnibus, or other vehicle, or of the platform of a railway-car. To the lowermost step is applied by means of hinged straps B B an extension-step, C, which is pivoted in socket-shaped bearings b b of the straps B B, so as to swing freely in the bearings until locked by the locking-springs d d, which are attached to the straps B and arranged to play in the recesses of the socket-shaped bearings, and are adapted to engage recesses e' of the pivots e e of the extension step C, as shown clearly in Fig. 2. The locking-springs b b snap into the recesses of the pivots e e when the extension-step C arrives in the horizontal position and is at right angles to the straps B B, and said straps extend downward from the lowest fixed step. For releasing the extension-step C from the locking-springs b b, the same has to be swung in the direction of the recesses e' on its axis in between the straps B B, whereby the pivots e e are turned on their axes and the ends of the locking-springs are pressed out by the recesses e' e' and slide upon the circumference of the pivots. The straps B B, with the extension-step C folded between them, may be finally placed or folded against the face of the riser of the lowest fixed step A, as shown clearly in Fig. 1. In this position the extension-step is locked by means of a sliding bolt, F, which engages a recess, g, in the under side of the tread of the second step A.

The locking mechanism is clearly shown in Figs. 5 and 6, and is for the sake of durability constructed without springs, it being formed simply of the slide-bolt f, that is engaged by an inwardly-projecting part of a fulcrumed lever, h, the outer ring-shaped end of which folds flush with the face of the bolt-casing when the bolt has been thrown outward, so as to lock the extension-step in position, as shown in Fig. 5.

For withdrawing the bolt f the ring-shaped end of the lever h is pulled out, as shown in dotted lines in Fig. 5, serving in this position also for taking hold of the extension-step C and moving the same away from the riser and swinging it by means of the hinged straps B into the position below the lowermost step until it arrives in horizontal position, when the locking-springs b b engage the recessed pivots of the extension-step C and lock the same rigidly in horizontal position, ready for use. In this position it greatly facilitates the stepping on the fixed steps.

It is obvious that the extension-step C has to be of somewhat less width than the width of the fixed steps and of somewhat less height than the hinged supporting-straps B B, so that it can readily swing between the straps whenever it is to be folded up against the riser of the second step.

The hinge-connection of the supporting-straps B B with the lowermost step and with the extension-step is produced by fixed straps M, which are firmly bolted on the lowermost step A and to the extension step C, as shown clearly in the drawings.

The construction of the locking device has the advantage that the ring shaped handle of the lever is used as the handle by which the extension-step is moved into lowered position, as well as into its folded position against the riser of the fixed step, the handle being only then turned into its normal position flush with the under side of the extension-step when the bolt is to be moved outward, so as to lock the extension-step to the tread of the fixed step.

Having thus described my invention, I claim as new and desire to secure by Letters Patent—

1. The combination, with a fixed step, of an extension-step, hinged straps applied to the fixed step and pivoted to the extension-step, and locking devices for retaining the extension-step at right angles to the hinged straps, substantially as set forth.

2. The combination, with a fixed step, of supporting-straps hinged to the fixed step, an extension-step in socket-bearings of the supporting-straps, so as to swing axially between said straps, and a locking device for retaining the extension-step when folded up against the riser of the fixed step, substantially as set forth.

3. The combination, with a fixed step, of supporting straps hinged to the fixed step, an extension-step pivoted in socket-bearings of said straps, and a slide-bolt applied to the extension-step and provided with an operating-lever having a handle, which handle also serves for taking hold of and swinging the extension-step into folded or lowered position, substantially as set forth.

4. The combination, with a fixed step, of an extension-step, hinged straps applied to the fixed step and pivoted to the extension-step, and locking-springs secured on the hinged straps and adapted to engage notches or recesses on the pivots of the extension step, substantially as shown and described.

In testimony that I claim the foregoing as my invention I have signed my name in presence of two subscribing witnesses.

JOSEPH SOLATINOW.

Witnesses:
SIDNEY MANN,
SOL. N. ROSENBAUM.